US012557732B2

(12) United States Patent
Reese

(10) Patent No.: US 12,557,732 B2
(45) Date of Patent: Feb. 24, 2026

(54) RETURN TO NEUTRAL ASSEMBLY

(71) Applicant: HUSQVARNA AB, Huskvarna (SE)

(72) Inventor: Braxton Reese, Charlotte, NC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/851,778

(22) PCT Filed: Dec. 19, 2022

(86) PCT No.: PCT/US2022/053332
§ 371 (c)(1),
(2) Date: Sep. 27, 2024

(87) PCT Pub. No.: WO2023/191870
PCT Pub. Date: Oct. 5, 2023

(65) Prior Publication Data

US 2025/0194463 A1 Jun. 19, 2025

Related U.S. Application Data

(60) Provisional application No. 63/325,278, filed on Mar. 30, 2022.

(51) Int. Cl.
*A01D 34/00* (2006.01)
*A01D 34/64* (2006.01)
(Continued)

(52) U.S. Cl.
CPC ......... *A01D 34/824* (2013.01); *A01D 34/006* (2013.01); *A01D 69/03* (2013.01)

(58) Field of Classification Search
CPC ...... A01D 34/00; A01D 34/006; A01D 34/63; A01D 34/64; A01D 34/82; A01D 34/824; A01D 69/00; A01D 69/03; B62D 11/006
(Continued)

(56) References Cited

U.S. PATENT DOCUMENTS 3,477,439 A * 11/1969 Zurek .................... A01D 34/64 474/5
4,558,558 A * 12/1985 Horner, Jr. ......... A01D 34/6806 56/11.6

(Continued)

FOREIGN PATENT DOCUMENTS

EP 2030497 B1 2/2017
EP 2850930 B1 7/2018
GB 2630840 A * 12/2024 ........... B62D 11/006

OTHER PUBLICATIONS

International Search Report and Written Opinion for PCT Application No. PCT/US2022/053332, dated Mar. 22, 2023.

*Primary Examiner* — Jason D Shanske
*Assistant Examiner* — Daniel M. Keck
(74) *Attorney, Agent, or Firm* — Burr & Forman

(57) ABSTRACT

A return to neutral assembly may include a mounting bracket that may be configured to operably couple the return to neutral assembly to a transmission, an adjustment lever which may operably couple a steering assembly to a transmission shaft of the transmission, a torsion spring which may be disposed coaxially with the transmission shaft, and an eccentric adjustment assembly which may define a neutral position for the adjustment lever. The torsion spring may include a first leg and a second leg which may each extend proximate to the adjustment lever at a second end of the adjustment lever and to the eccentric adjustment assembly when the adjustment lever may be at the neutral position. One of the first leg or the second leg may lose contact with the eccentric adjustment assembly while maintaining contact with the adjustment lever when the adjustment lever may move away from the neutral position.

20 Claims, 11 Drawing Sheets

(51) Int. Cl.

| | |
|---|---|
| ***A01D 34/82*** | (2006.01) |
| ***A01D 69/00*** | (2006.01) |
| ***A01D 69/03*** | (2006.01) |
| ***B62D 11/00*** | (2006.01) |

(58) Field of Classification Search
USPC .......................................................... 180/315
See application file for complete search history.

(56) References Cited

U.S. PATENT DOCUMENTS

| | | | | |
|---|---|---|---|---|
| 6,487,857 | B1 | 12/2002 | Poplawski et al. | |
| 6,601,663 | B2 | 8/2003 | Hauser | |
| 6,640,526 | B2 | 11/2003 | Velke et al. | |
| 6,672,411 | B1 | 1/2004 | Mouser | |
| 6,715,284 | B1 | 4/2004 | Poplawski et al. | |
| 6,758,290 | B2 | 7/2004 | Jolliff et al. | |
| 6,766,715 | B1 | 7/2004 | Wiley et al. | |
| 6,782,797 | B1 | 8/2004 | Brandenburg et al. | |
| 6,880,333 | B1 | 4/2005 | Taylor et al. | |
| 6,912,831 | B2 | 7/2005 | Velke et al. | |
| 6,915,872 | B2 | 7/2005 | Wiley et al. | |
| 6,923,092 | B1 | 8/2005 | Wiley et al. | |
| 6,968,687 | B1 | 11/2005 | Poplawski et al. | |
| 7,197,873 | B1 | 4/2007 | Windhorst et al. | |
| 7,234,385 | B2 | 6/2007 | Dong et al. | |
| 7,302,789 | B2 | 12/2007 | Eavenson, Sr. et al. | |
| 7,340,890 | B1 | 3/2008 | Poplawski et al. | |
| 7,458,311 | B2 | 12/2008 | Korthals | |
| 7,458,438 | B2 | 12/2008 | Nishino et al. | |
| 7,467,677 | B2 | 12/2008 | Barrier | |
| 7,624,996 | B2 | 12/2009 | Velke et al. | |
| 7,634,953 | B2 | 12/2009 | Hoffman et al. | |
| 7,647,754 | B2 | 1/2010 | Velke et al. | |
| 7,748,480 | B2 | 7/2010 | Loxterkamp et al. | |
| 7,908,960 | B2 | 3/2011 | Daigre | |
| 7,942,224 | B2 | 5/2011 | Marshall et al. | |
| 8,001,883 | B1 | 8/2011 | Langenfeld | |
| 8,011,458 | B2 | 9/2011 | Hauser | |
| 8,235,151 | B2 | 8/2012 | Nunez et al. | |
| 8,240,420 | B1 | 8/2012 | Bartel et al. | |
| 8,459,137 | B1 | 6/2013 | Mccoy et al. | |
| 8,522,901 | B1 | 9/2013 | Vanlue et al. | |
| 8,695,450 | B1 | 4/2014 | Mccoy et al. | |
| 8,733,841 | B2 | 5/2014 | Morris | |
| 8,978,796 | B2 | 3/2015 | Gallazzini | |
| 9,141,126 | B2 | 9/2015 | Hynes et al. | |
| 9,211,793 | B2 | 12/2015 | Yasuda et al. | |
| 9,228,572 | B2 | 1/2016 | Richardson et al. | |
| 9,313,953 | B2 | 4/2016 | Borshov et al. | |
| 9,341,258 | B1 | 5/2016 | Templin | |
| 9,409,596 | B2 | 8/2016 | Hauser et al. | |
| 9,664,270 | B1 | 5/2017 | Langenfeld | |
| 9,682,723 | B2 | 6/2017 | Weinlader | |
| 10,046,797 | B2 | 8/2018 | Schaedler et al. | |
| 10,167,937 | B2 | 1/2019 | Crosby et al. | |
| 10,414,436 | B1 | 9/2019 | Bonny | |
| 10,588,256 | B2 | 3/2020 | Baena et al. | |
| 10,638,661 | B2 | 5/2020 | Kawai et al. | |
| 10,711,887 | B2 | 7/2020 | Murashima et al. | |
| 10,724,632 | B1 | 7/2020 | Thompson et al. | |
| 10,834,870 | B2 | 11/2020 | Wagner | |
| 10,974,763 | B1 | 4/2021 | Bonny | |
| 10,981,589 | B1 | 4/2021 | Bartel et al. | |
| 10,986,782 | B2 | 4/2021 | Fisher et al. | |
| 2005/0044836 | A1* | 3/2005 | Goto | A01D 69/10<br>56/14.7 |
| 2013/0074467 | A1* | 3/2013 | Zwieg | A01D 34/74<br>56/229 |
| 2017/0086376 | A1 | 3/2017 | Burns et al. | |
| 2019/0249762 | A1* | 8/2019 | Sugimoto | F16H 57/04 |
| 2020/0000039 | A1 | 1/2020 | Reese | |
| 2022/0379947 | A1* | 12/2022 | Winter | A01D 69/03 |
| 2023/0116081 | A1* | 4/2023 | Stucky | B62D 11/06<br>180/6.2 |

* cited by examiner

RETURN TO NEUTRAL ASSEMBLY

TECHNICAL FIELD

Example embodiments generally relate to lawn care vehicles and, more particularly, to riding lawn care vehicles equipped with a return to neutral mechanism.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines, and are relatively inexpensive. Meanwhile, at the other end of the spectrum, riding lawn mowers, such as lawn tractors, can be quite large. Riding lawn mowers provide the convenience of a riding vehicle as well as a typically larger cutting deck as compared to a walk-behind model. Similarly, riding lawn care vehicles typically provide users with increased convenience by enabling them to perform the yard maintenance tasks faster without exerting effort to push or walk with a vehicle.

Riding lawn care vehicles typically include steering assemblies that are used to direct the movement of the riding lawn care vehicles. The steering assemblies often take the familiar form of a steering wheel. However, handlebar assemblies have also been used in some cases. More recently, some so called "zero turn" mowers have employed separate steering levers or even a joystick to provide steering functionality. When these separate steering levers are employed, it is common for a drive wheel on each side of the vehicle to be controlled by a corresponding lever on a same side of the vehicle. The drive wheel is then driven forward or backward based on whether the corresponding steering lever is also pushed forward, away from the operator, or pulled backward, toward the operator. Thus, the steering assemblies of the zero turn models often include a return to neutral assembly to bias the steering assembly into a neutral state so that the lawn care vehicle does not move when the steering assemblies are not in use. Zero turn models may be useful or desirable in some contexts or by some operators and thus, continued improvements in the design and operation of these models is needed.

BRIEF SUMMARY OF SOME EXAMPLES

In one example embodiment, a return to neutral assembly for a riding lawn care vehicle may be provided. The return to neutral assembly may include a mounting bracket that may be configured to operably couple the return to neutral assembly to a transmission of the riding lawn care vehicle, an adjustment lever which may operably couple a steering assembly of the riding lawn care vehicle to a transmission shaft of the transmission proximate to a first end of the adjustment lever, a torsion spring which may be disposed coaxially with the transmission shaft, and an eccentric adjustment assembly which may define a neutral position for the adjustment lever. The torsion spring may include a first leg and a second leg. The first leg and the second leg may each extend proximate to the adjustment lever at a second end of the adjustment lever and to the eccentric adjustment assembly when the adjustment lever may be at the neutral position. One of the first leg or the second leg may lose contact with the eccentric adjustment assembly while maintaining contact with the adjustment lever when the adjustment lever may move away from the neutral position.

In another example embodiment, a riding lawn care vehicle may be provided. The riding lawn care vehicle may include a frame to which wheels of the riding lawn care vehicle may be attachable, at least one hydraulic motor which may be configured to independently power one or more wheels, a transmission which may be operably coupled to the at least one hydraulic motor, a return to neutral assembly which may be operably coupled to the transmission, and a steering assembly which may be operably coupled to the return to neutral assembly. The return to neutral assembly may include a mounting bracket that may be configured to operably couple the return to neutral assembly to a transmission of the riding lawn care vehicle, an adjustment lever which may operably couple a steering assembly of the riding lawn care vehicle to a transmission shaft of the transmission proximate to a first end of the adjustment lever, a torsion spring which may be disposed coaxially with the transmission shaft, and an eccentric adjustment assembly which may define a neutral position for the adjustment lever. The torsion spring may include a first leg and a second leg. The first leg and the second leg may each extend proximate to the adjustment lever at a second end of the adjustment lever and to the eccentric adjustment assembly when the adjustment lever may be at the neutral position. One of the first leg or the second leg may lose contact with the eccentric adjustment assembly while maintaining contact with the adjustment lever when the adjustment lever may move away from the neutral position.

BRIEF DESCRIPTION OF THE SEVERAL VIEWS OF THE DRAWING(S)

Having thus described some embodiments of the present invention in general terms, reference will now be made to the accompanying drawings, which are not necessarily drawn to scale, and wherein:

DETAILED DESCRIPTION

Figure 1A:
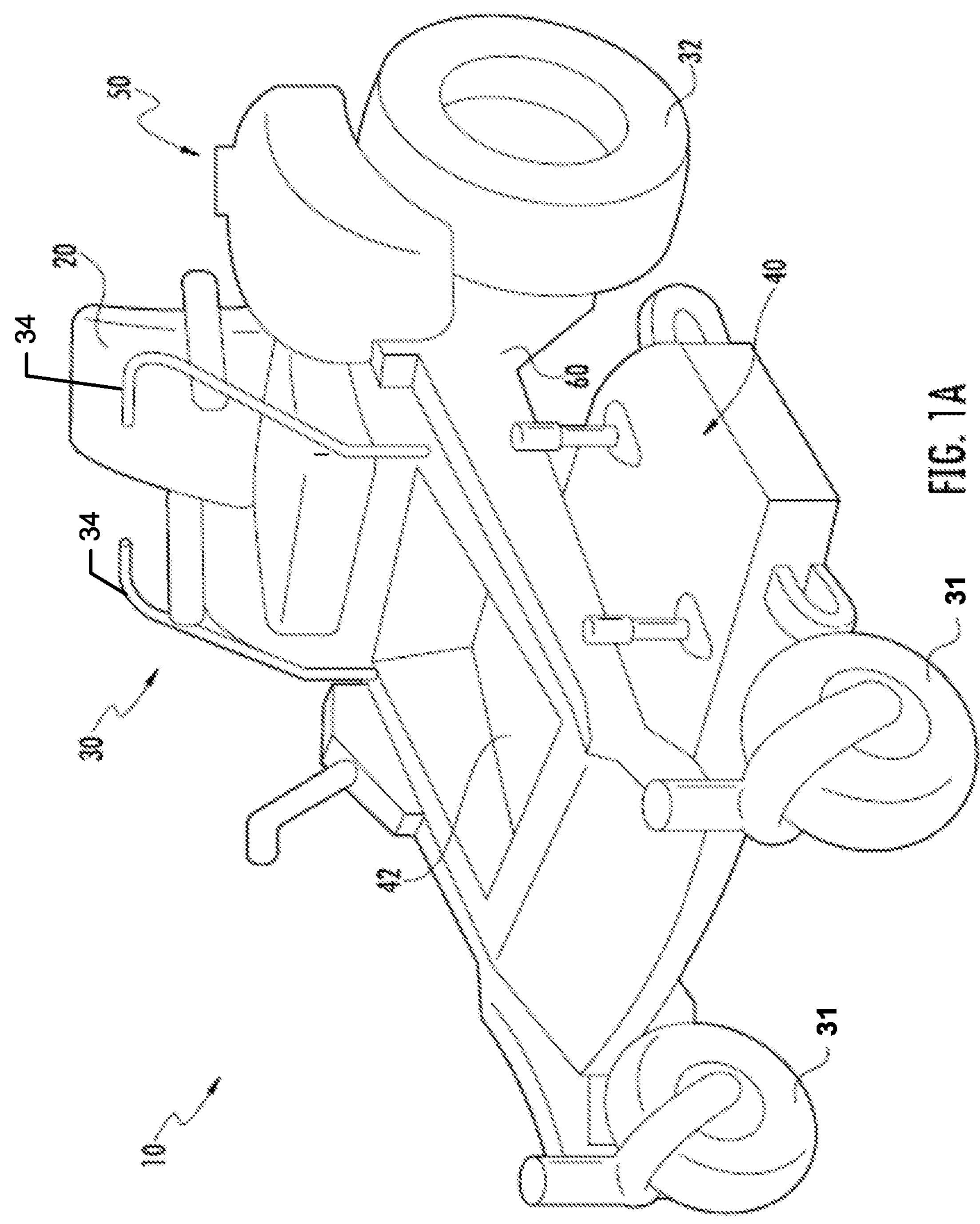
FIG. 1A illustrates a perspective view of a riding lawn care vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the phrase "operable coupling" and variants thereof should be understood to relate to direct or indirect connection that, in either case, enables functional interconnection of components that are operably coupled to each other.

Figure 1B:
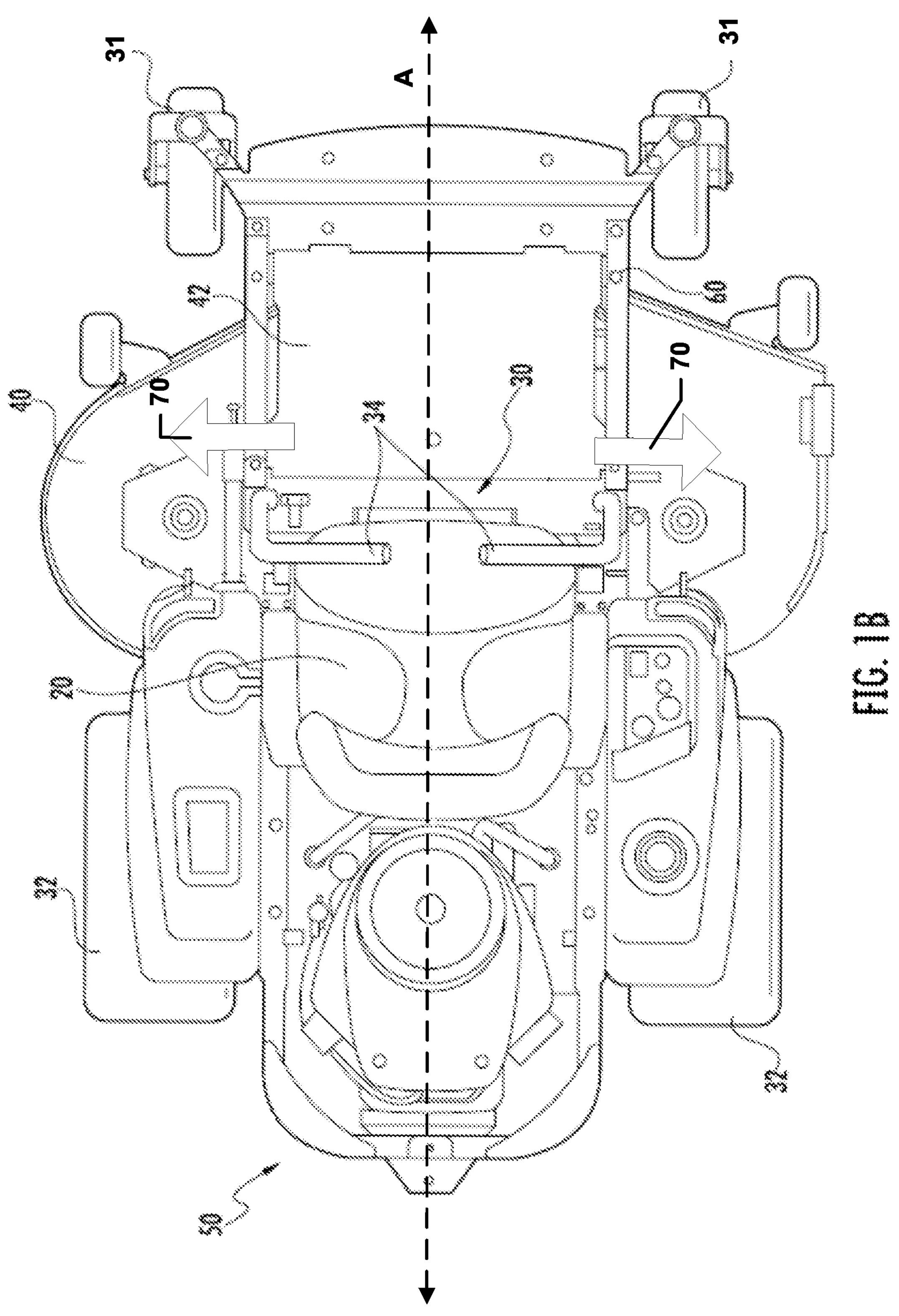
FIG. 1B illustrates a top view of the riding lawn care vehicle according to an example embodiment.

FIG. 1, which includes FIGS. 1A and 1B, illustrates a riding lawn care vehicle 10 according to an example embodiment. FIG. 1A illustrates a perspective view of the riding lawn care vehicle 10, and FIG. 1B illustrates a top view of the riding lawn care vehicle 10 according to an example embodiment. In some embodiments, the riding lawn care vehicle 10 may include a seat 20 that may be disposed at a center, rear, or front portion of the riding lawn care vehicle 10. The riding lawn care vehicle 10 may also include a steering assembly 30 (e.g., a set of steering levers or the like) functionally connected to wheels 31 and/or 32 of the riding lawn care vehicle 10 to allow the operator to steer the riding lawn care vehicle 10.

Figure 2:
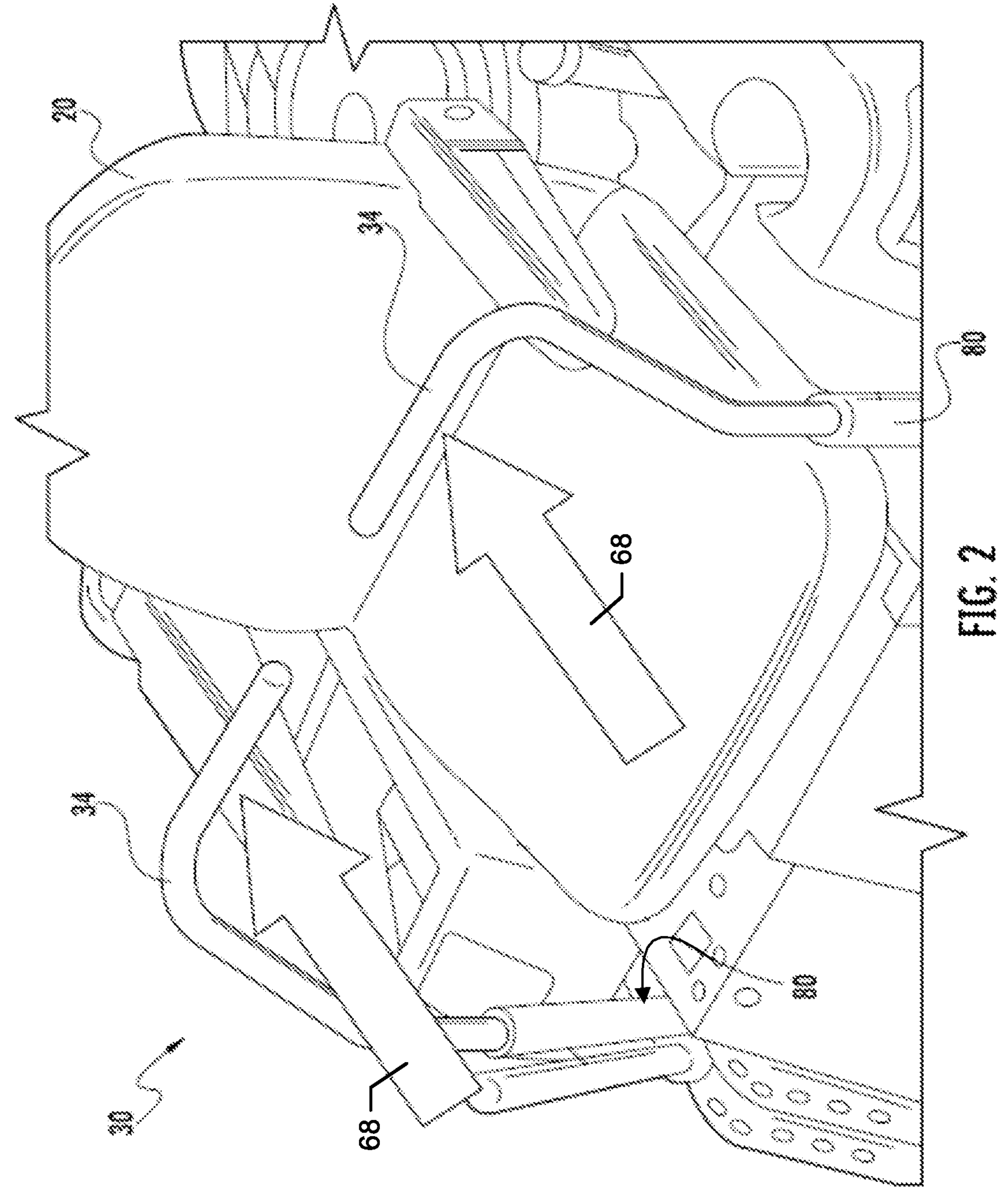
FIG. 2 illustrates a perspective view of a steering assembly with steering levers positioned to be pulled back for rearward propulsion according to an example embodiment.

FIG. 2 illustrates a perspective view of a steering assembly with steering levers positioned to be pulled back for rearward propulsion according to an example embodiment. Referring to FIGS. 1 and 2, the operator may sit on the seat 20, which may be disposed to the rear of the steering assembly 30 to provide input for steering of the riding lawn care vehicle 10 via the steering assembly 30. However, some models may be stand-up models that eliminate the seat 20. If the seat 20 is eliminated, the operator may stand at an operator station proximate to the steering assembly 30. In an example embodiment, the steering assembly 30 may include separately operable steering levers 34 shown specifically in FIG. 1B and FIG. 2.

The riding lawn care vehicle 10 may also include a cutting deck 40 having at least one cutting blade (e.g., three cutting blades) mounted therein. The cutting deck 40 may be positioned substantially rearward of a pair of front wheels 31 and substantially forward of a pair of rear wheels 32 in a position to enable the operator to cut grass using the cutting blade(s) when the cutting blade(s) are rotated below the cutting deck 40 when the cutting deck 40 is in a cutting position. However, in some alternative examples, the cutting deck 40 may be positioned in front of the front wheels 31. In some embodiments, a footrest 42 may also be positioned above the cutting deck 40 forward of the seat 20 to enable the operator to rest his or her feet thereon while seated in the seat 20. In embodiments that do not include the seat 20, the footrest 42 may form the operator station from which a standing operator controls the riding lawn care vehicle 10. When operating to cut grass, the grass clippings may be captured by a collection system, mulched, or expelled from the cutting deck 40 via either a side discharge or a rear discharge.

In the pictured example embodiment, an engine 50 of the riding lawn care vehicle 10 is disposed to the rear of a seated operator. However, in other example embodiments, the engine 50 could be in different positions such as in front of or below the operator. As shown in FIG. 1, the engine 50 may be operably coupled to one or more of the wheels 31 and/or 32 to provide drive power for the riding lawn care vehicle 10. The engine 50, the steering assembly 30, the cutting deck 40, the seat 20, and other components of the riding lawn care vehicle 10 may be operably connected (directly or indirectly) to a frame 60 of the riding lawn care vehicle 10. The frame 60 may be a rigid structure configured to provide support, connectivity, and/or interoperability functions for various ones of the components of the riding lawn care vehicle 10.

In some example embodiments, the steering assembly 30 may be embodied as an assembly of metallic and/or other rigid components that may be welded, bolted, and/or otherwise attached to each other and operably coupled to the wheels of the riding lawn care vehicle 10 to which steering inputs are provided (e.g., rear wheels 32). For example, the steering assembly 30 may include or otherwise be coupled with hydraulic motors that independently power one or more drive wheels (e.g., rear wheels 32) on each respective side of the riding lawn care vehicle 10. The steering levers 34 may be operable to move forward (i.e., in a direction opposite arrow 68 in FIG. 2) and rearward (i.e., in the direction shown by arrow 68 in FIG. 2) of a neutral position while in the inboard position (shown in both FIGS. 1 and 2).

When a steering lever 34 is pushed forward of the neutral position (e.g., away from the operator an opposite the direction of arrow 68), the corresponding hydraulic motor may drive the corresponding wheel forward. When a steering lever 34 is pulled rearward of the neutral position (e.g., toward the operator as shown by the direction of arrows 68 in FIG. 2), the corresponding hydraulic motor may drive the corresponding wheel backward. Thus, when both steering levers 34 are pushed forward of the neutral position the same amount, the riding lawn care vehicle 10 travels forward in substantially a straight line because approximately the same amount of forward drive input is provided to each drive wheel. When both steering levers 34 are pulled back relative to the neutral position the same amount, the riding lawn care vehicle 10 travels backward (e.g., rearward) in substantially a straight line because approximately the same amount of rearward drive input is provided to each drive wheel.

When one steering lever 34 is pushed forward and the other steering lever 34 is pulled back, the riding lawn care vehicle 10 begins to turn in a circle and/or spin. Steering right and left may be accomplished by providing uneven amounts of input to the steering levers 34. Other steering control systems may be employed in some alternative embodiments.

Figure 3:
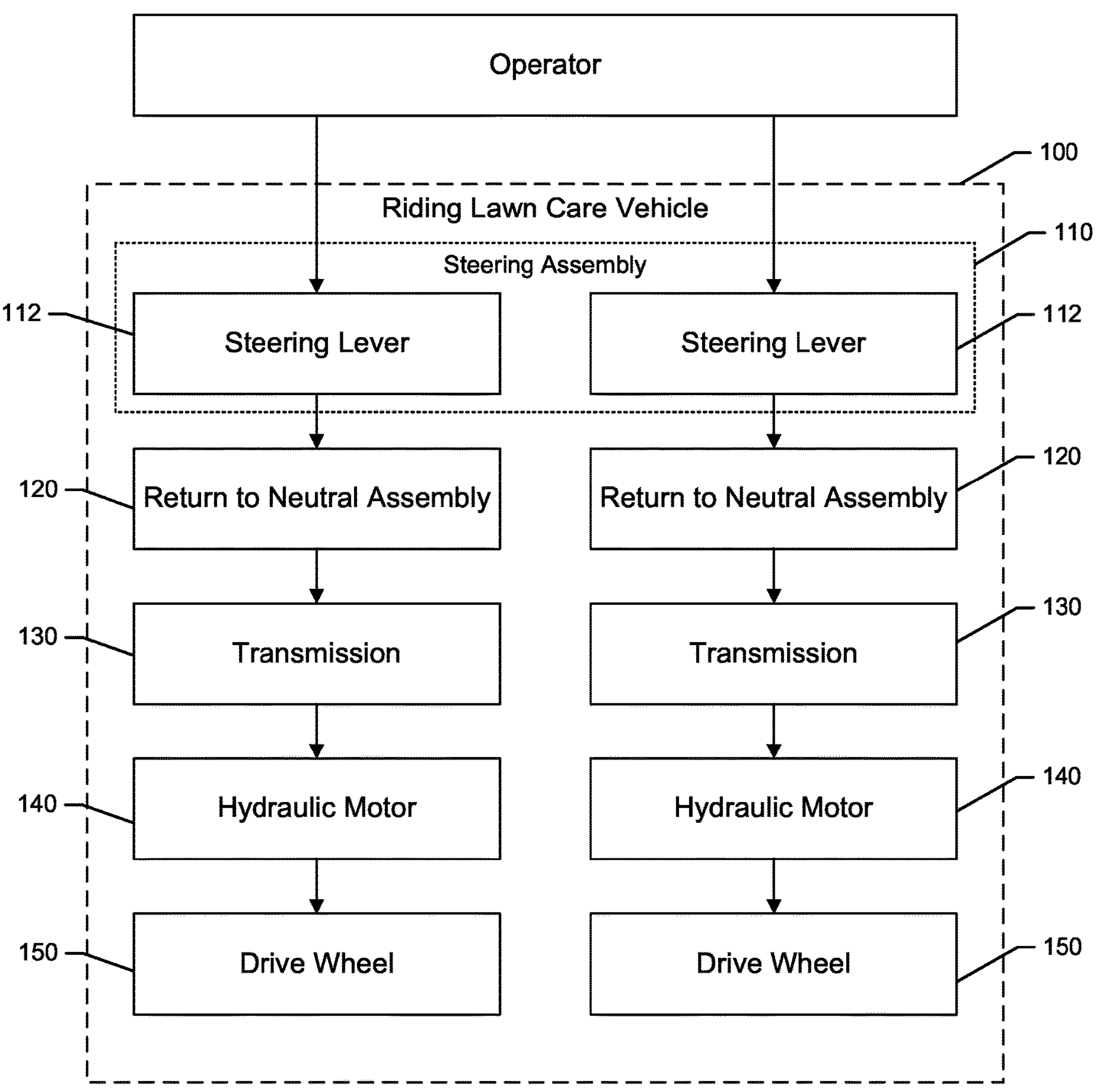
FIG. 3 illustrates a block diagram of some riding lawn care vehicle components according to an example embodiment.
Figure 4:
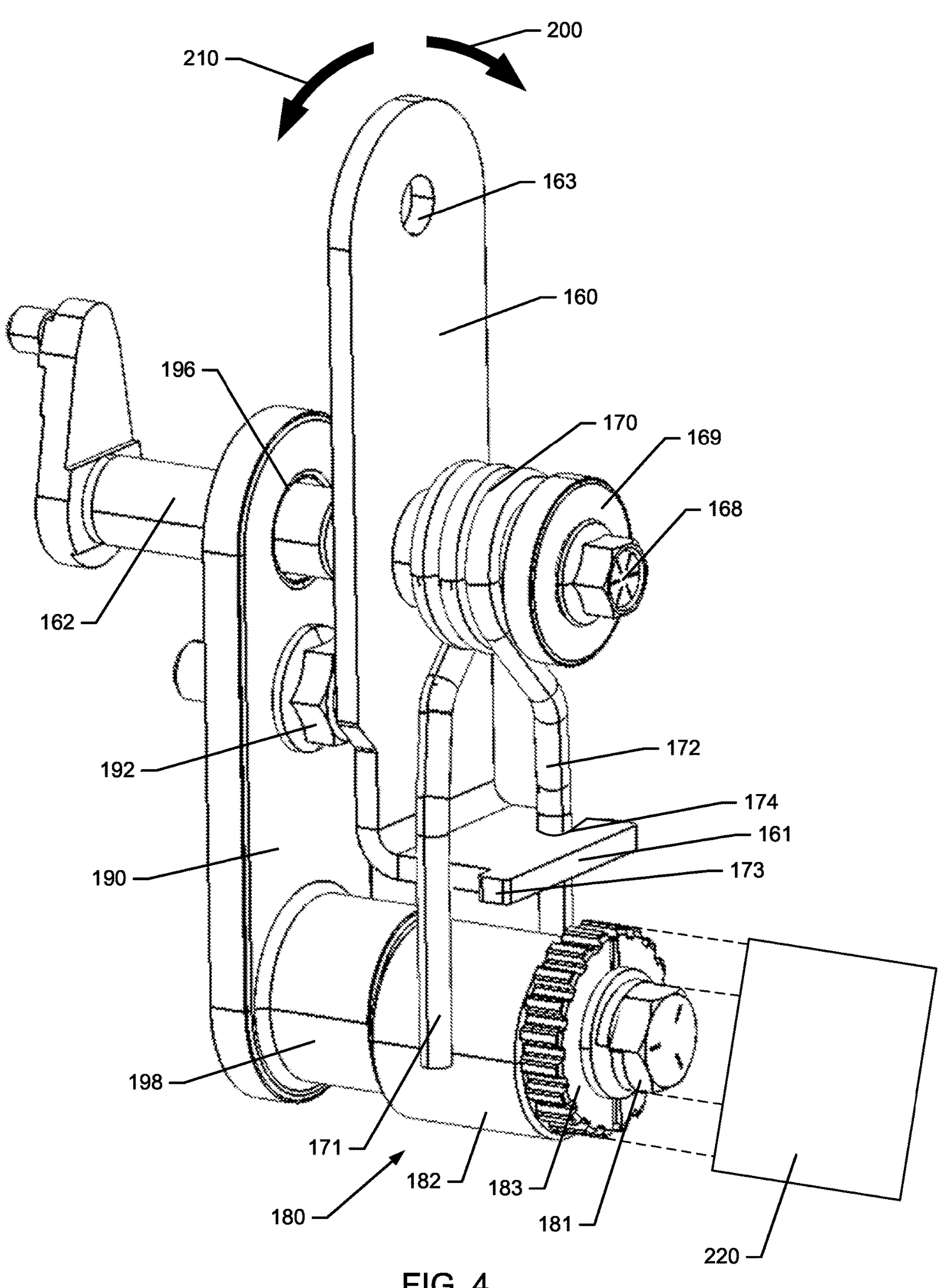
FIG. 4 illustrates a perspective view of the return to neutral assembly according to an example embodiment.
Figure 5:
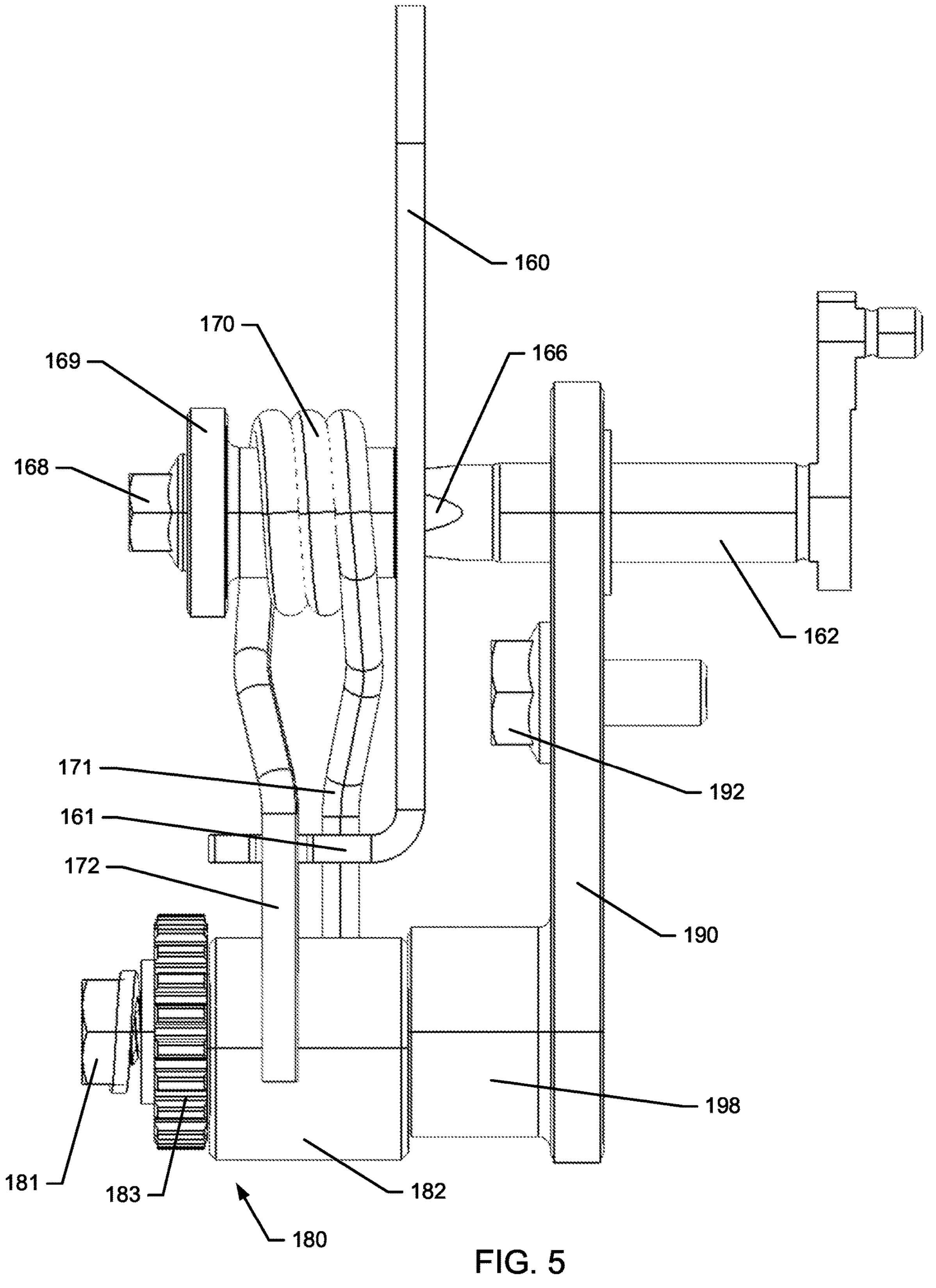
FIG. 5 illustrates a side view of the return to neutral assembly according to an example embodiment.
Figure 6:
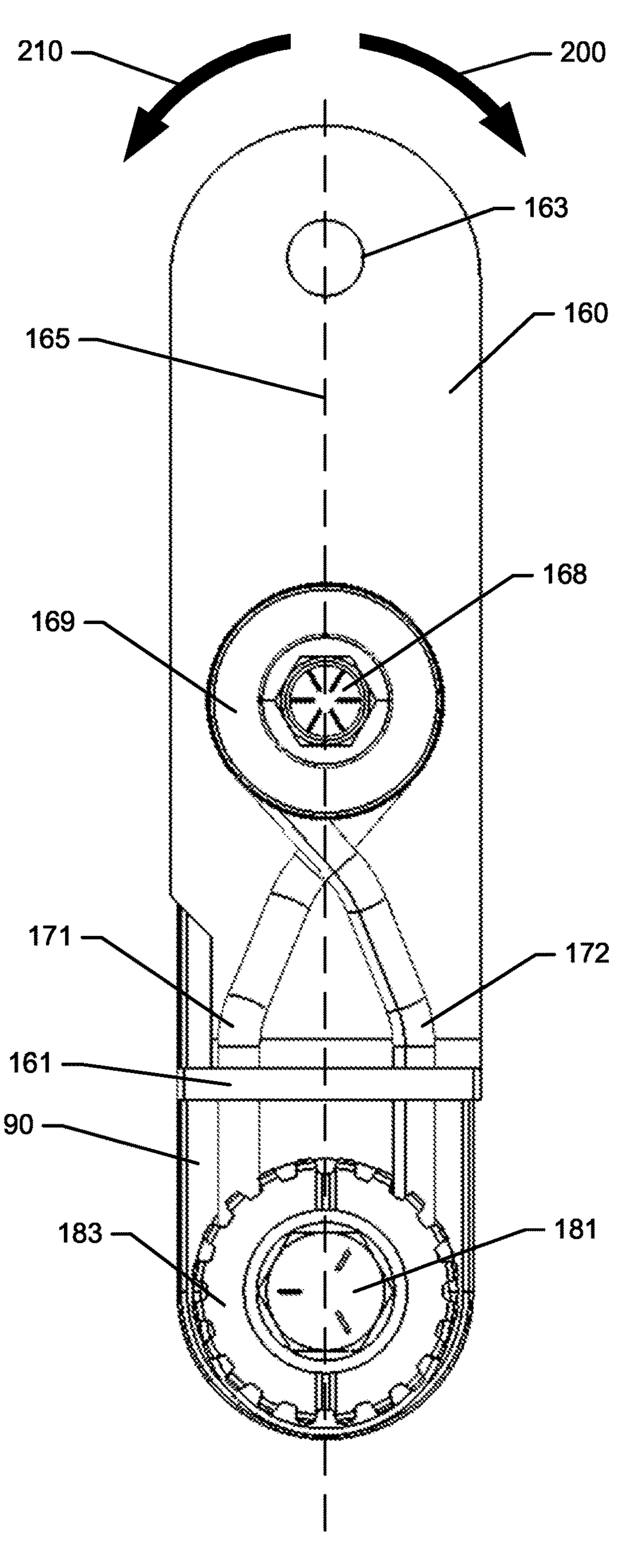
FIG. 6 illustrates a front view of the return to neutral assembly according to an example embodiment.
Figure 7:
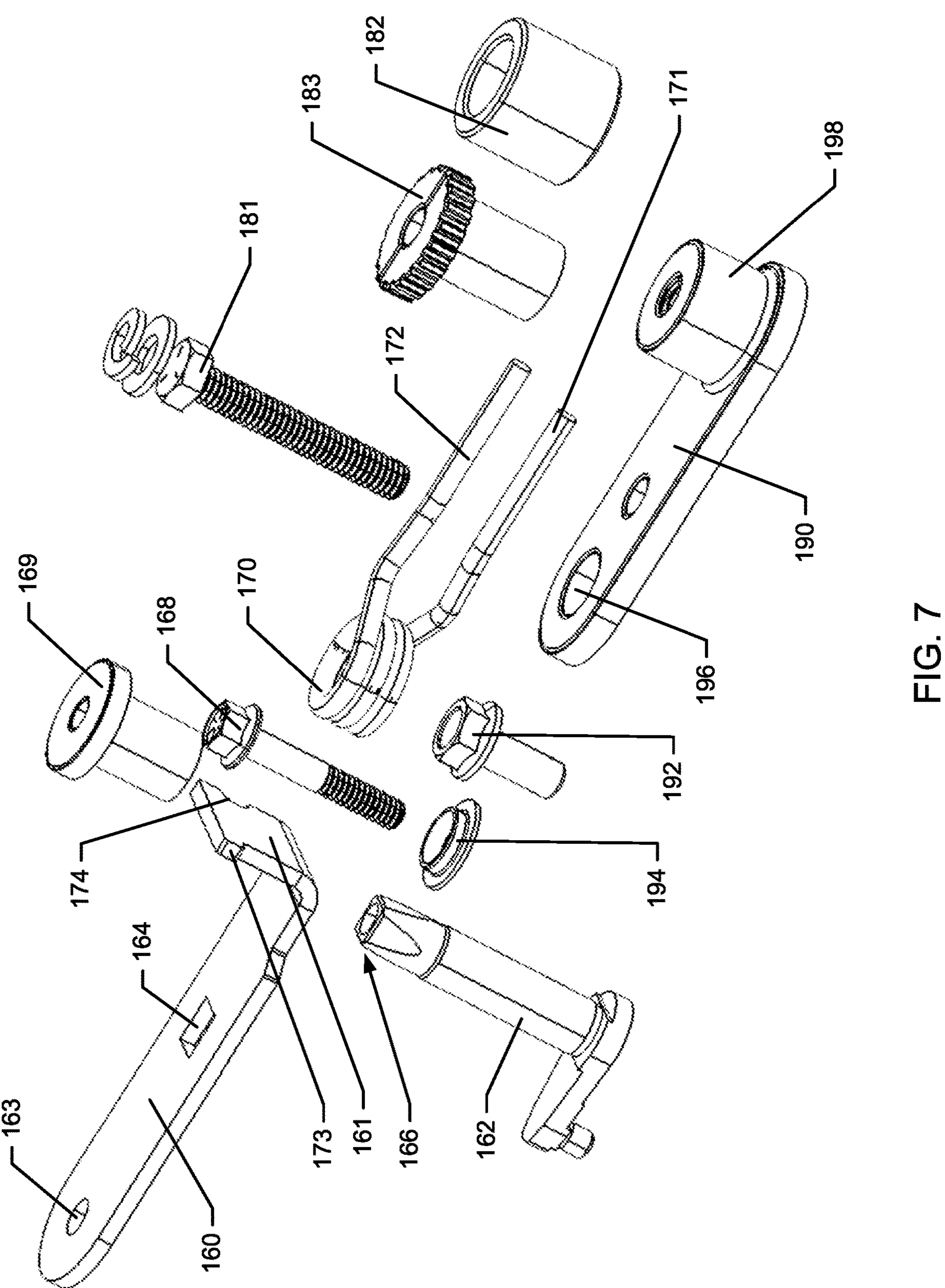
FIG. 7 illustrates an exploded perspective view of the return to neutral assembly according to an example embodiment.
Figure 8:
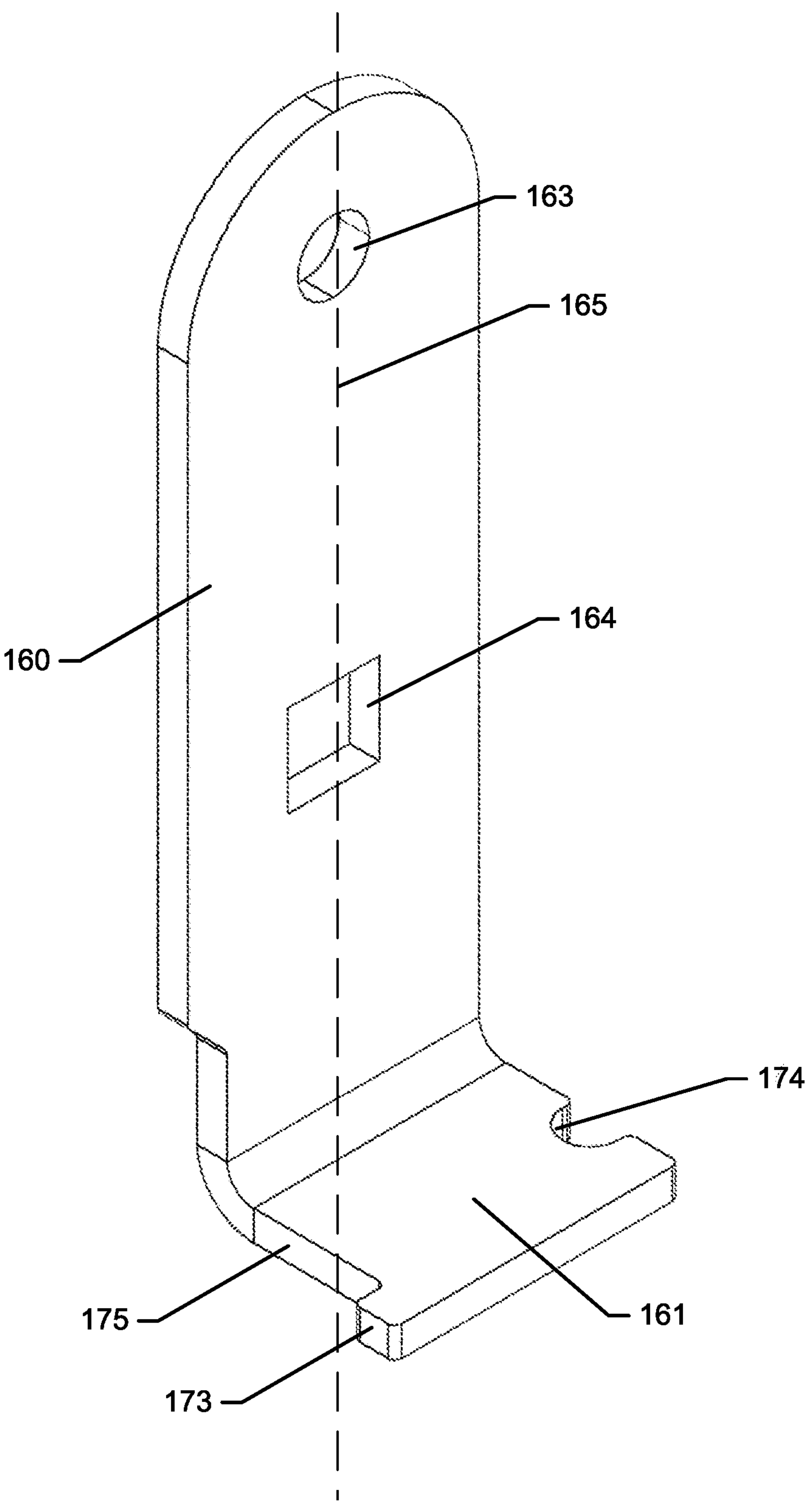
FIG. 8 illustrates a perspective view of the adjustment lever according to an example embodiment.
Figure 9:
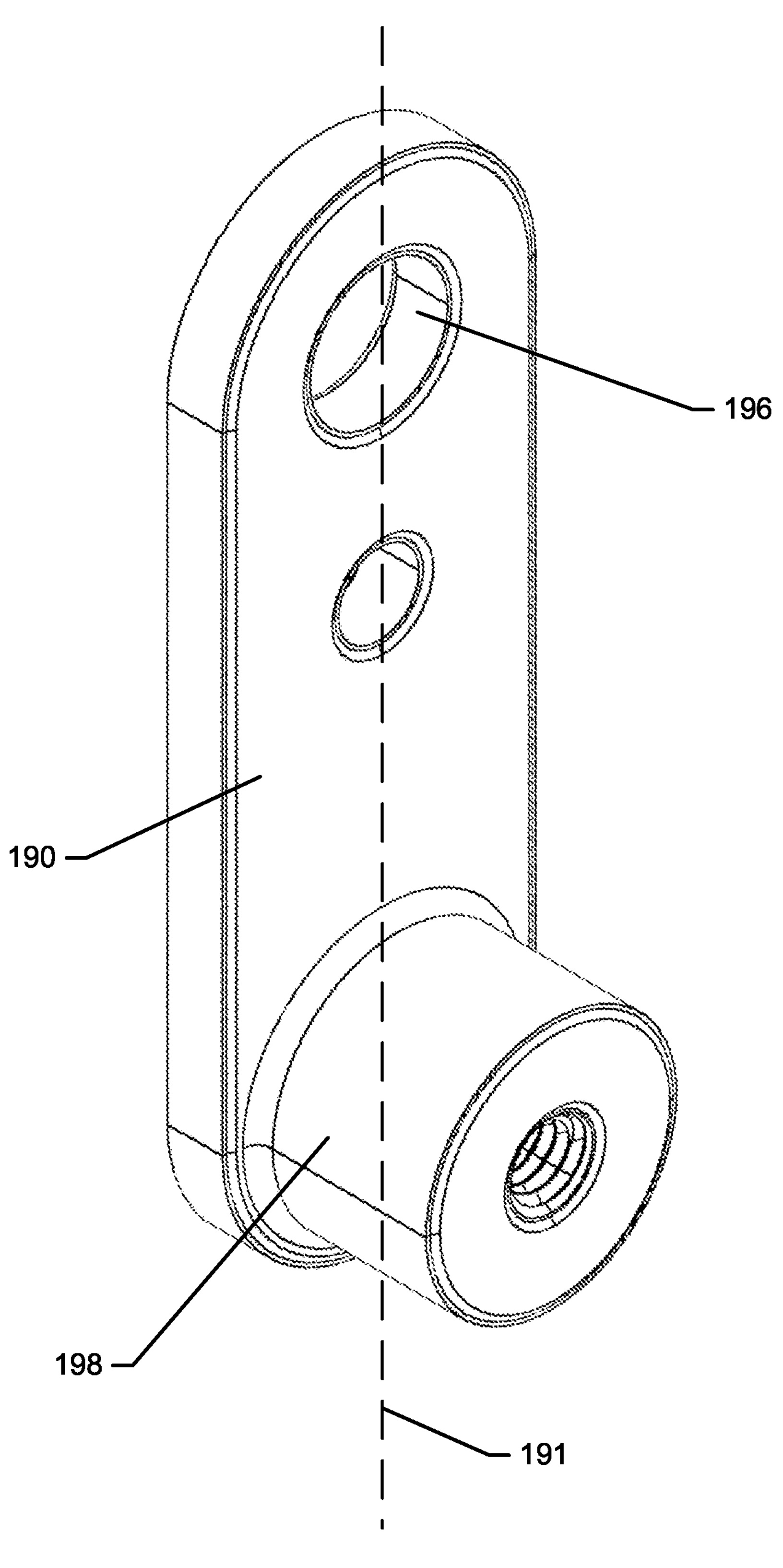
FIG. 9 illustrates a perspective view of the mounting bracket according to an example embodiment.
Figure 10A:
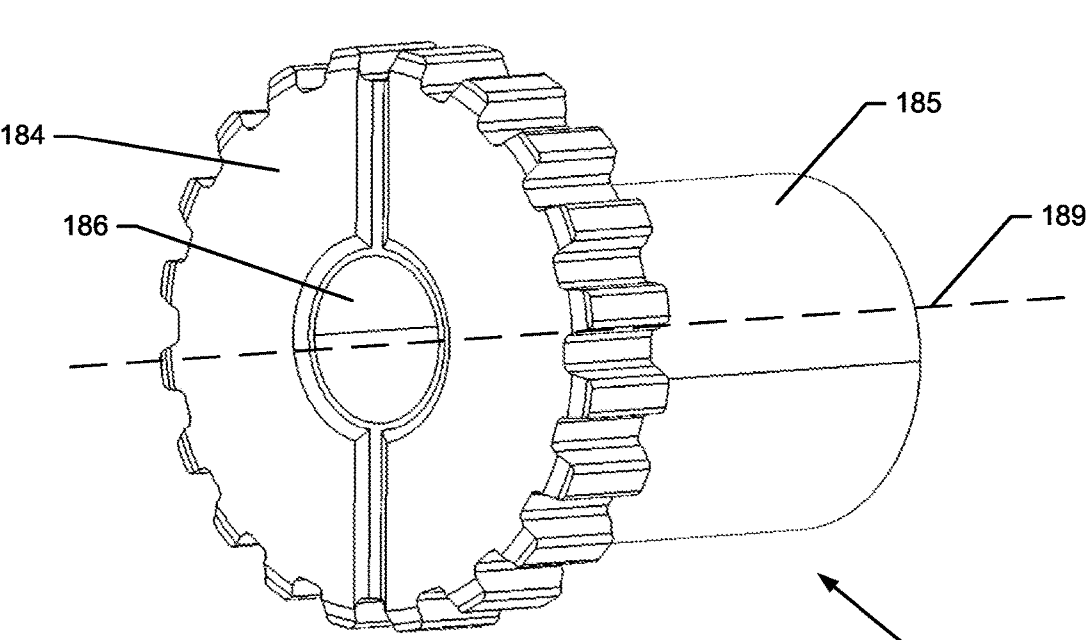
FIG. 10A illustrates a perspective view of the splined retainer according to an example embodiment.
Figure 10B:
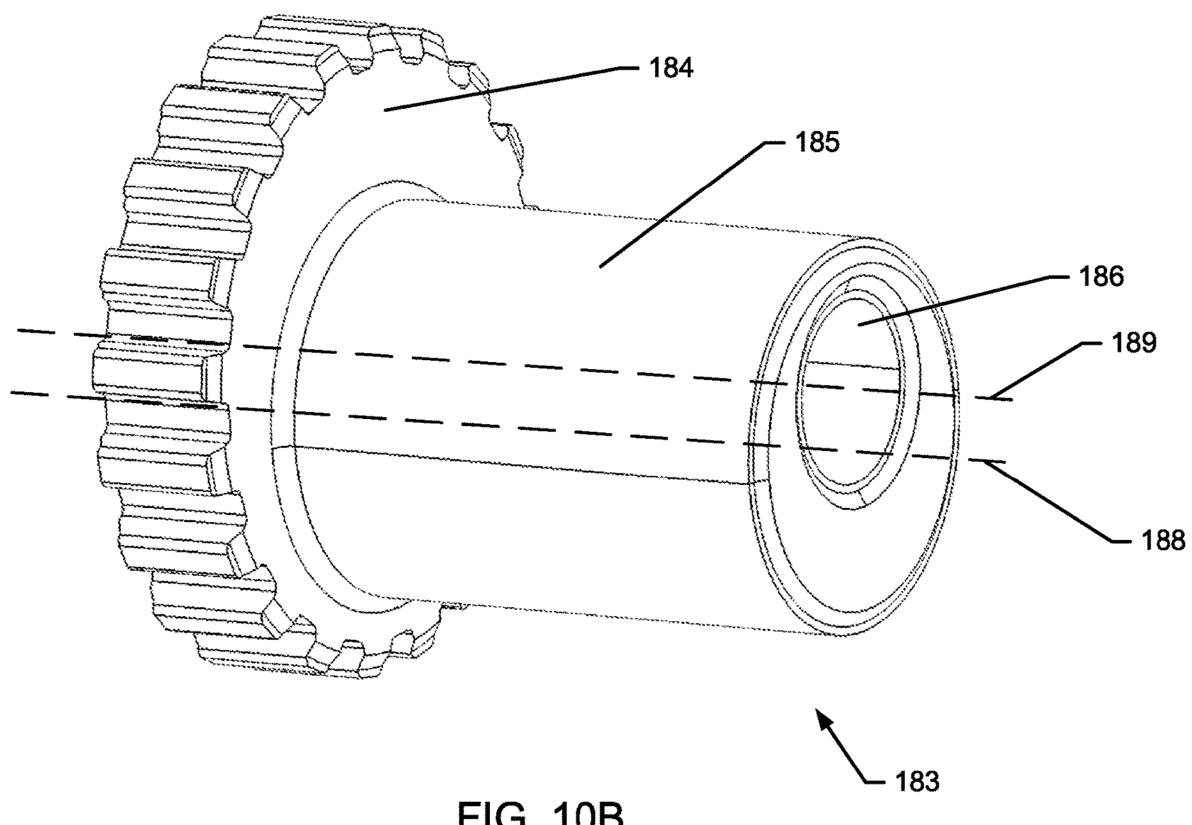
FIG. 10B illustrates a perspective view of the splined retainer according to an example embodiment.

Although the steering levers 34 are generally moved forward (i.e., opposite the direction of the arrows 68 shown in FIG. 2) or backward (i.e., in the direction of the arrows 68 shown in FIG. 2) in any desirable combination while they are in the operating positions shown in FIGS. 1 and 2, it should be appreciated that the steering levers 34 may also be moved to an outboard position (e.g., in a non-operational state) by moving the steering levers 34 outwardly in the direction shown by arrows 70 in FIG. 1B. In this regard, although the steering levers 34 are shown in the inboard (or operational) position in FIGS. 1 and 2, the steering levers 34 may be moved in the direction of arrows 70 (i.e., outboard) relative to their inboard position and into a non-operational position. In some cases, each of the steering levers 34 may be operably coupled to respective lever mounts 80 that may pivot to enable the steering levers 34 to move outwardly (e.g., to the outboard position) or inwardly (e.g., to an inboard and/or operating position). In some embodiments, when at least one (and sometimes both) of the steering levers 34 is pivoted outwardly, brakes may be applied and the operator may easily mount or dismount the riding lawn care vehicle 10 and sit in or leave the seat 20. FIG. 3 illustrates a block diagram of a riding lawn care vehicle 100 according to an example embodiment. The riding lawn care vehicle 100 may include a steering assembly 110 which the operator may interact with to drive the riding lawn care vehicle 100. In some embodiments, the steering assembly 110 may include two separately operable steering levers 112. The steering levers 112 may be disposed on opposing sides of an operator's position such that the operator may operate both of the steering levers 112 simultaneously. In other words, the operator may have one hand on each of the steering levers 112 in order to maneuver the riding lawn care vehicle 100 as desired. The steering levers 112 may be operably coupled to respective return to neutral assemblies 120. In some embodiments, each return to neutral assembly 120 may bias the steering lever 112 to which it is operably coupled back into a neutral position when the operator is not actively using the steering lever 112, so that the riding lawn care vehicle 100 does not accelerate at unwanted times. More details about the return to neutral assembly 120 will be discussed below in relation to later figures. The return to neutral assemblies 120 may each be operably coupled to a respective transmission 130 which the return to neutral assembly 120 may interact with. The return to neutral assembly 120 may be configured to transmit input forces on the steering assembly 110 from the operator, to the transmission 130. Each transmission 130 may therefore transfer the inputs from the steering assembly 110 to a hydraulic motor 140. The hydraulic motors 140 may be operably coupled to respective drive wheels 150, and configured to generate and provide a torque force to the respective drive wheel 150 in order to induce movement of the riding lawn care vehicle 100. In some embodiments, there may be a total of two drive wheels 150, and each drive wheel 150 may have its own corresponding hydraulic motor 140, transmission 130, return to neutral assembly 120 and steering lever 112.

FIGS. 4-7 illustrate various views of a return to neutral assembly 120 according to an example embodiment, and FIGS. 8-10B illustrate views of various individual components of the return to neutral assembly 120 according to example embodiments. Referring now to FIGS. 4-10B, the return to neutral assembly 120 may include an adjustment lever 160, a torsion spring 170, an eccentric adjustment assembly 180 and a mounting bracket 190. In some embodiments, the adjustment lever 160 may be a substantially flat piece of metal that may be bent at a portion thereof to form an L-shaped bracket. A long side of the L-shaped bracket may include a first end of the adjustment lever 160, and a short side of the L-shaped bracket may include a second end of the adjustment lever 160. In some embodiments, the second end of the adjustment lever 160 may include a bent portion 161. In some cases, the bent portion 161 may be bent at an angle substantially perpendicular to the first end of the adjustment lever 160. The adjustment lever 160 may be operably coupled to the steering lever 112 at a first aperture 163 (e.g., via a linkage or connecting rod) and to a transmission shaft 162 at a second aperture 164. Both the first and second apertures 163 and 164 may pass through the adjustment lever 160 in a long side of the L-shaped bracket, and the first aperture 163 may be disposed proximate to the first end of the adjustment lever 160. The second end, and thus the bent portion 161, may be disposed at a distal end of the adjustment lever 160 relative to the first end. In some cases, a distance measured from the second aperture 164 (and therefore the transmission shaft 162 when assembled) to the bent portion 161 of the adjustment lever 160 may be less than a distance measured from the second aperture 164 to the first aperture 163, where the steering assembly 110 may operably couple to the adjustment lever 160. In some embodiments, the second aperture 164 may be substantially rectangular in shape, and the transmission shaft 162 may have a substantially rectangular perimeter 166 at a distal end that may be configured to operably couple with the second aperture 164. The adjustment lever 160 may be configured to rotate about an axis of rotation passing through the center of the transmission shaft 162 and in the direction of arrows 200 and/or 210 responsive to the operator applying a pushing or pulling force on the steering lever 112. In this regard, the adjustment lever 160 may accordingly rotate the transmission shaft 162 about the rotational axis disposed therein via the second aperture 164.

The return to neutral assembly 120 may further include a shaft fastener 168 configured to operably couple to the distal end of the transmission shaft 162 where the rectangular perimeter 166 may be disposed. The shaft fastener 168 may operably couple a flanged spacer 169 to the adjustment lever 160 and may operably couple both the flanged spacer 169 and the adjustment lever 160 to the transmission shaft 162. In this regard, the operator may apply an input force to the steering lever 112 which may be transferred to the adjustment lever 160 which may transfer the input force to the transmission shaft 162. The transmission shaft 162 may then transmit the input force to the transmission 130 and thus the hydraulic motor 140. The shaft fastener 168 may also secure the torsion spring 170 in place around a perimeter of the flanged spacer 169, coaxial with the transmission shaft 162. The flanged spacer 169 and the torsion spring 170 may both be operably coupled to the transmission shaft 162 and disposed on an opposite side of the adjustment lever 160 from the transmission 130. The torsion spring 170 may include a first leg 171 and a second leg 172 which may each be configured to extend in a direction parallel to a longitudinal axis 165 of the adjustment lever 160 when the return to neutral assembly 120 is in the neutral position. In this regard, the longitudinal axis 165 of the adjustment lever 160 may extend from the first end of the adjustment lever 160 through the second end of the adjustment lever 160. In some embodiments, the neutral position may correspond to an orientation of the transmission shaft 162 that yields zero axle rotation with the hydraulic motor 140 operating at roughly 3600 RPM.

The first and second legs 171 and 172 may be separated from each other by the bent portion 161, which, in some embodiments, may include a retention protrusion 173 and a retention notch 174. In this regard, when the adjustment lever 160 rotates, the first leg 171 of the torsion spring 170 may slide relative to the bent portion 161, along a sliding surface 175 of the adjustment lever 160. In some embodiments, the sliding surface 175 may be defined as a side surface of the adjustment lever 160 extending from the retention protrusion 173 at the second end of the adjustment lever 160 to the first end of the adjustment lever 160. Thus the retention protrusion 173 may prohibit the first leg 171 from sliding off the end of, and out of contact with, the sliding surface 175 when the adjustment lever 160 rotates in the direction of arrow 200. On the other hand, the retention notch 174 may retain the second leg 172 in a single position relative to the bent portion 161 when the adjustment lever 160 rotates in the direction of arrow 210.

The first and second legs 171 and 172 of the torsion spring 170 may extend down beyond the bent portion 161 and physically contact the eccentric adjustment assembly 180. In some embodiments, the eccentric adjustment assembly 180 may include a fastener 181, a spacer 182, and a splined retainer 183. The fastener 181 may be configured to operably couple the eccentric adjustment assembly 180 to the mounting bracket 190. The splined retainer 183 may include a head 184, a shank 185, and a bore 186. In some embodiments, the fastener 181 may be operably coupled to the splined retainer 183 through the bore 186. The bore 186 may pass through an entire length of the splined retainer 183 and may include a longitudinal axis 189 passing through the entirety of the bore 186. In some cases, the splined retainer 183 may be substantially eccentrically shaped. In this regard, relative to the head 184, the longitudinal axis 189 of the bore 186 may also act as a central axis of the head 184, which may be substantially circular in shape. Relative to the shank 185 and its longitudinal axis 188, the bore 186 may be axially offset such that the longitudinal axis 189 of the bore 186 is not coaxial with the longitudinal axis 188 of the shank 185. Thus, when the fastener 181 is operably coupled to the splined retainer 183, the shank 185 may have the appearance of being eccentrically shaped since it is not aligned with the longitudinal axis 189 of the bore 186 and thus offset from the fastener 181. The spacer 182 may be configured to operably couple to the splined retainer 183 around a perimeter of the shank 185, and may be disposed proximate to the head 184 as well. In this regard, the spacer 182 may therefore also be axially offset from the fastener 181 and the longitudinal axis 189 of the bore 186 when the spacer 182 is operably coupled to the shank 185.

In some embodiments, the eccentric adjustment assembly 180 may define the location of the neutral position for the return to neutral assembly 120 as a whole. In this regard, the first and second legs 171 and 172 of the torsion spring 170 may be disposed proximate to the spacer 182 when the return to neutral assembly 120 is in the neutral position. In some embodiments, the first and second legs 171 and 172 may contact the spacer 182 at respective points of contact that may be diametrically opposed and tangent to the perimeter of the spacer 182, when the return to neutral assembly 120 is in the neutral position. With the adjustment lever 160 in the neutral position, the torsion spring 170 may be in a resting state in which the first and second legs 171 and 172 have respective resting positions.

The resting state of the torsion spring 170 may be defined such that a desired amount of preload may be built into the torsion spring 170. As such, the desired amount of preload may be determined by the dimensions of the bent portion 161 and the spacer 182. In this regard, the width of the bent portion 161 along with the outer diameter of the spacer 182, may define the amount of preload that is in the torsion spring 170 when the return to neutral assembly 120 is in the neutral position. In other words, the preload may be determined by how far apart the first leg 171 is from the second leg 172 when the torsion spring 170 is in the resting state and the adjustment lever 160 is in the neutral position. In their respective resting positions, the first and second legs 171 and 172 may each extend beyond their respective points of contact with the spacer 182.

In some embodiments, the adjustment lever 160 may be displaced from the neutral position responsive to the operator applying a force to the steering lever 112. When the adjustment lever 160 is not in the neutral position, the bent portion 161 may bias either the first leg 171 or the second leg 172 away from its respective resting position, while the other of the first or second leg 171 or 172 may remain in its respective resting position in contact with the spacer 182 of the eccentric adjustment assembly 180. In other words, actuating the steering lever 112 may accordingly rotate the adjustment lever 160 in either the direction of arrow 200 or arrow 210. When the adjustment lever 160 rotates in the direction of arrow 200, the bent portion 161 of the adjustment lever 160 may push the first leg 171 of the torsion spring 170 away from its resting position proximate to the spacer 182, while the first leg 171 remains in contact with the bent portion 161. Thus, a distance measured between the first leg 171 and the second leg 172 may be increased as a result of the motion of the adjustment lever 160. When this happens, the first leg 171 may be configured to slide along the sliding surface 175 of the bent portion 161. The sliding motion of the first leg 171 may occur responsive to the torsion spring 170 being compressed or extended out of its resting state. Meanwhile, the second leg 172 may remain in its respective resting state due to its contact with the spacer 182. As the first leg 171 gets further away from its resting position proximate to the spacer 182, the spring force biasing the first leg 171 back to its resting position may increase accordingly. On the other hand, when the adjustment lever 160 rotates in the direction of arrow 210, the bent portion 161 of the adjustment lever 160 may push the second leg 172 of the torsion spring 170 away from its resting position proximate to the spacer 182, while the second leg 172 remains in contact with the bent portion 161. Thus, a distance measured between the first leg 171 and the second leg 172 may be increased as a result of the motion of the adjustment lever 160. In this case, however, the second leg 172 is not configured to slide relative to the bent portion 161. Rather, the second leg 172 is held in place relative to the bent portion 161 by the retention notch 174. Meanwhile, the first leg 171 may remain in its respective resting state due to its contact with the spacer 182. As the second leg 172 gets further away from its resting position proximate to the spacer 182, the spring force biasing the second leg 172 back to its resting position may increase accordingly. Therefore, the spring force generated from pulling either of the first or second legs 171 or 172 away from the spacer 182 may bias the adjustment lever 160 back to the neutral position.

In some embodiments, the splined retainer 183 and the spacer 182 may be operably coupled to the mounting bracket 190 in a plurality of orientations. In this regard, the splined retainer 183 and the spacer 182 may be rotated before being fixed in place by tightening the fastener 181. Accordingly, the eccentric relationship of the shank 185 relative to the fastener 181 and the head 184 may configure the spacer 182 to be disposable at different positions. In this regard, the neutral position may be customizable at the time of installing the return to neutral assembly 120 based on the angular orientation given to the splined retainer 183. Accordingly, in some cases, a distance defined from a longitudinal axis of the spacer 182 to a rotational axis of the transmission shaft 162 may be greater than a distance defined from a longitudinal axis of the fastener 181 to the rotational axis of the transmission shaft 162. In some embodiments, the splined retainer 183 and the fastener 181 may be configured to operably couple to a singular tool 220 simultaneously. The tool 220 may be configured with multiple sized retainers in a single tool 220. Thus, a larger retainer may be configured to operably couple to the head 184 of the splined retainer 183 to hold it still in a desired orientation while a smaller retainer may be operably couple to the fastener 181 (e.g., at a hex head of the fastener 181) to tighten the fastener 181. In this regard, the fastener 181 may be tightened without rotating the splined retainer 183 away from a desired orientation. This may be important because rotating the splined retainer 183 may thereby alter the precise location of the neutral position that is set by the spacer 182. As such, the ability of the tool 220 to maintain the orientation of the splined retainer 183 while also tightening the fastener 181 may enhance the effectiveness of the eccentric adjustment assembly 180.

The mounting bracket 190 may be configured to operably couple the return to neutral assembly 120 to a housing or casing of the transmission 130. In this regard, the mounting bracket 190 may not be configured to rotate or move relative to the transmission 130 or to any other components of the return to neutral assembly 120. Accordingly, the mounting bracket 190 may include a longitudinal axis 191 that may be fixed in a position parallel to a longitudinal axis 165 of the adjustment lever 160 when the adjustment lever 160 is in the neutral position. In some embodiments, the mounting bracket 190 may operably couple to the transmission 130 via a mounting fastener 192. Additionally, in some embodiments, the mounting bracket 190 may also operably couple to the transmission shaft 162 via a washer 194 configured to center the transmission shaft 162 in a bore 196 of the mounting bracket 190. In some other embodiments, the mounting bracket 190 may further include a protruded base 198 which may be configured to operably couple to the fastener 181 of the eccentric adjustment assembly 180.

Some example embodiments may provide for a return to neutral assembly for a riding lawn care vehicle. The return to neutral assembly may include a mounting bracket that may be configured to operably couple the return to neutral assembly to a transmission of the riding lawn care vehicle, an adjustment lever which may operably couple a steering assembly of the riding lawn care vehicle to a transmission shaft of the transmission proximate to a first end of the adjustment lever, a torsion spring which may be disposed coaxially with the transmission shaft, and an eccentric adjustment assembly which may define a neutral position for the adjustment lever. The torsion spring may include a first leg and a second leg. The first leg and the second leg may each extend proximate to the adjustment lever at a second end of the adjustment lever and to the eccentric adjustment assembly when the adjustment lever may be at the neutral position. One of the first leg or the second leg may lose contact with the eccentric adjustment assembly while maintaining contact with the adjustment lever when the adjustment lever may move away from the neutral position.

The return to neutral assembly of some embodiments may include additional, optional features, and/or the features described above may be modified or augmented. Some examples of modifications, optional features and augmentations are described below. It should be appreciated that the modifications, optional features and augmentations listed below may each be added alone, or they may be added cumulatively in any desirable combination. For example, in some embodiments, the eccentric adjustment assembly may include a fastener which may be operably coupled to the mounting bracket, a splined retainer which may be disposed on the fastener proximate to the mounting bracket, and a spacer which may be disposed on the splined retainer. In some cases, the splined retainer may include a head, a shank which may be operably coupled to the head, and a bore which may extend through an entirety of the splined retainer. In an example embodiment, the bore may be coaxial with a longitudinal axis of the head and axially offset from a longitudinal axis of the shank. In some cases, the fastener may be configured to pass through the bore to operably couple the splined retainer to the mounting bracket. In an example embodiment, the spacer may operably couple to the shank of the splined retainer and may be axially offset from the fastener when the splined retainer may be operably coupled to the mounting bracket. In some cases, a distance between a longitudinal axis of the spacer and a rotational axis of the transmission shaft may be greater than a distance between a longitudinal axis of the fastener and the rotational axis of the transmission shaft. In an example embodiment, the first leg and the second leg may each contact the spacer at a tangent point on diametrically opposed sides of the spacer. In some cases, the first leg and the second leg may each extend beyond the tangent point. In an example embodiment, the adjustment lever may include a retention protrusion and a retention notch formed on a bent portion that may be disposed at the second end of the adjustment lever. In some cases, the first leg may be configured to slide relative to the adjustment lever along a sliding surface responsive to motion of the adjustment lever away from the neutral position in a first direction while maintaining contact between the adjustment lever and the first leg. In an example embodiment, the sliding surface may extend from the retention protrusion to the intersection of the second end with the first end. In some cases, the retention notch may fix the second leg in place relative to the adjustment lever responsive to motion of the adjustment lever in a second direction. In an example embodiment, a distance measured from the transmission shaft to the bent portion may be less than a distance measured from the transmission shaft to an attachment aperture at the first end of the adjustment lever where the steering assembly may operably couple to the adjustment lever. In some cases, the splined retainer may be configured to be held in place while the fastener may be tightened simultaneously by a single tool that may engage both the splined retainer and a head of the fastener. In an example embodiment, a longitudinal axis of the mounting bracket may be parallel to a longitudinal axis of the adjustment lever when the adjustment lever may be in the neutral position. In some cases, the torsion spring may be operably coupled to the transmission shaft on an opposite side of the adjustment lever from the transmission.

Some example embodiments may provide for a riding lawn care vehicle. The riding lawn care vehicle may include a frame to which wheels of the riding lawn care vehicle may be attachable, at least one hydraulic motor which may be configured to independently power one or more wheels, a transmission which may be operably coupled to the at least one hydraulic motor, a return to neutral assembly which may be operably coupled to the transmission, and a steering assembly which may be operably coupled to the return to neutral assembly. The return to neutral assembly may include a mounting bracket that may be configured to operably couple the return to neutral assembly to a transmission of the riding lawn care vehicle, an adjustment lever which may operably couple a steering assembly of the riding lawn care vehicle to a transmission shaft of the transmission proximate to a first end of the adjustment lever, a torsion spring which may be disposed coaxially with the transmission shaft, and an eccentric adjustment assembly which may define a neutral position for the adjustment lever. The torsion spring may include a first leg and a second leg. The first leg and the second leg may each extend proximate to the adjustment lever at a second end of the adjustment lever and to the eccentric adjustment assembly when the adjustment lever may be at the neutral position. One of the first leg or the second leg may lose contact with the eccentric adjustment assembly while maintaining contact with the adjustment lever when the adjustment lever may move away from the neutral position.

The riding lawn care vehicle of some embodiments may include additional, optional features, and/or the features described above may be modified or augmented. Some examples of modifications, optional features and augmentations are described below. It should be appreciated that the modifications, optional features and augmentations listed below may each be added alone, or they may be added cumulatively in any desirable combination. For example, in some embodiments, the eccentric adjustment assembly may include a fastener which may be operably coupled to the mounting bracket, a splined retainer which may be disposed on the fastener proximate to the mounting bracket, and a spacer which may be disposed on the splined retainer. In some cases, the splined retainer may include a head, a shank which may be operably coupled to the head, and a bore which may extend through an entirety of the splined retainer. In an example embodiment, the bore may be coaxial with a longitudinal axis of the head and axially offset from a longitudinal axis of the shank. In some cases, the fastener may be configured to pass through the bore to operably couple the splined retainer to the mounting bracket. In an example embodiment, the spacer may operably couple to the shank of the splined retainer and may be axially offset from the fastener when the splined retainer may be operably coupled to the mounting bracket. In some cases, a distance between a longitudinal axis of the spacer and a rotational axis of the transmission shaft may be greater than a distance between a longitudinal axis of the fastener and the rotational axis of the transmission shaft. In an example embodiment, the first leg and the second leg may each contact the spacer at a tangent point on diametrically opposed sides of the spacer. In some cases, the first leg and the second leg may each extend beyond the tangent point. In an example embodiment, the adjustment lever may include a retention protrusion and a retention notch formed on a bent portion that may be disposed at the second end of the adjustment lever. In some cases, the first leg may be configured to slide relative to the adjustment lever along a sliding surface responsive to motion of the adjustment lever away from the neutral position in a first direction while maintaining contact between the adjustment lever and the first leg. In an example embodiment, the sliding surface may extend from the retention protrusion to the intersection of the second end with the first end. In some cases, the retention notch may fix the second leg in place relative to the adjustment lever responsive to motion of the adjustment lever in a second direction. In an example embodiment, a distance measured from the transmission shaft to the bent portion may be less than a distance measured from the transmission shaft to an attachment aperture at the first end of the adjustment lever where the steering assembly may operably couple to the adjustment lever. In some cases, the splined retainer may be configured to be held in place while the fastener may be tightened simultaneously by a single tool that may engage both the splined retainer and a head of the fastener. In an example embodiment, a longitudinal axis of the mounting bracket may be parallel to a longitudinal axis of the adjustment lever when the adjustment lever may be in the neutral position. In some cases, the torsion spring may be operably coupled to the transmission shaft on an opposite side of the adjustment lever from the transmission.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

That which is claimed:

1. A return to neutral assembly for a riding lawn care vehicle, the return to neutral assembly comprising:
- a mounting bracket configured to operably couple the return to neutral assembly to a transmission of the riding lawn care vehicle;
- an adjustment lever operably coupling a steering assembly of the riding lawn care vehicle to a transmission shaft of the transmission proximate to a first end of the adjustment lever;
- a torsion spring disposed coaxially with the transmission shaft; and
- an eccentric adjustment assembly defining a neutral position for the adjustment lever,
- wherein the torsion spring comprises a first leg and a second leg,
- wherein the first leg and the second leg each extend proximate to the adjustment lever at a second end of the adjustment lever and to the eccentric adjustment assembly when the adjustment lever is at the neutral position, and
- wherein one of the first leg or the second leg loses contact with the eccentric adjustment assembly while maintaining contact with the adjustment lever when the adjustment lever is moved away from the neutral position.

2. The return to neutral assembly of claim 1, wherein the eccentric adjustment assembly comprises:
- a fastener operably coupled to the mounting bracket;
- a splined retainer disposed on the fastener proximate to the mounting bracket; and
- a spacer disposed on the splined retainer;
- wherein the splined retainer comprises:
  - a head;
  - a shank operably coupled to the head; and
  - a bore extending through an entirety of the splined retainer, and
- wherein the bore is coaxial with a longitudinal axis of the head and axially offset from a longitudinal axis of the shank.

3. The return to neutral assembly of claim 2, wherein the fastener is configured to pass through the bore to operably couple the splined retainer to the mounting bracket, and
wherein the spacer operably couples to the shank of the splined retainer and is axially offset from the fastener when the splined retainer is operably coupled to the mounting bracket.

4. The return to neutral assembly of claim 3, wherein a distance between a longitudinal axis of the spacer and a rotational axis of the transmission shaft is greater than a distance between a longitudinal axis of the fastener and the rotational axis of the transmission shaft.

5. The return to neutral assembly of claim 2, wherein the first leg and the second leg each contact the spacer at a tangent point on diametrically opposed sides of the spacer,
wherein the first leg and the second leg each extend beyond the tangent point.

6. The return to neutral assembly of claim 2, wherein the splined retainer is configured to be held in place while the fastener is tightened simultaneously by a single tool that engages both the splined retainer and a head of the fastener.

7. The return to neutral assembly of claim 1, wherein the adjustment lever comprises a retention protrusion and a retention notch formed on a bent portion that is disposed at the second end of the adjustment lever,
wherein the first leg is configured to slide relative to the adjustment lever along a sliding surface, the sliding surface extending from the retention protrusion to the intersection of the second end with the first end, responsive to motion of the adjustment lever away from the neutral position in a first direction while maintaining contact between the adjustment lever and the first leg, and
wherein the retention notch fixes the second leg in place relative to the adjustment lever responsive to motion of the adjustment lever in a second direction.

8. The return to neutral assembly of claim 7, wherein a distance measured from the transmission shaft to the bent portion is less than a distance measured from the transmission shaft to an attachment aperture at the first end of the adjustment lever where the steering assembly operably couples to the adjustment lever.

9. The return to neutral assembly of claim 1, wherein a longitudinal axis of the mounting bracket is parallel to a longitudinal axis of the adjustment lever when the adjustment lever is in the neutral position.

10. The return to neutral assembly of claim 1, wherein the torsion spring is operably coupled to the transmission shaft on an opposite side of the adjustment lever from the transmission.

11. A riding lawn care vehicle comprising:
a frame to which wheels of the riding lawn care vehicle are attachable;
at least one hydraulic motor configured to independently power one or more wheels;
a transmission operably coupled to the at least one hydraulic motor;
a return to neutral assembly operably coupled to the transmission; and
a steering assembly operably coupled to the return to neutral assembly,
wherein the return to neutral assembly comprises:
a mounting bracket configured to operably couple the return to neutral assembly to a transmission of the riding lawn care vehicle;
an adjustment lever operably coupling the steering assembly of the riding lawn care vehicle to a transmission shaft of the transmission proximate to a first end of the adjustment lever;
a torsion spring disposed coaxially with the transmission shaft; and
an eccentric adjustment assembly defining a neutral position for the adjustment lever,
wherein the torsion spring comprises a first leg and a second leg,
wherein the first leg and the second leg each extend proximate to the adjustment lever at a second end of the adjustment lever and to the eccentric adjustment assembly when the adjustment lever is at the neutral position, and
wherein one of the first leg or the second leg loses contact with the eccentric adjustment assembly while maintaining contact with the adjustment lever when the adjustment lever is moved away from the neutral position.

12. The riding lawn care vehicle of claim 11, wherein the eccentric adjustment assembly comprises:
a fastener operably coupled to the mounting bracket;
a splined retainer disposed on the fastener proximate to the mounting bracket; and
a spacer disposed on the splined retainer;
wherein the splined retainer comprises:
a head;
a shank operably coupled to the head; and
a bore extending through an entirety of the splined retainer, and
wherein the bore is coaxial with a longitudinal axis of the head and axially offset from a longitudinal axis of the shank.

13. The riding lawn care vehicle of claim 12, wherein the fastener is configured to pass through the bore to operably couple the splined retainer to the mounting bracket, and
wherein the spacer operably couples to the shank of the splined retainer and is axially offset from the fastener when the splined retainer is operably coupled to the mounting bracket.

14. The riding lawn care vehicle of claim 13, wherein a distance between a longitudinal axis of the spacer and a rotational axis of the transmission shaft is greater than a distance between a longitudinal axis of the fastener and the rotational axis of the transmission shaft.

15. The riding lawn care vehicle of claim 12, wherein the first leg and the second leg each contact the spacer at a tangent point on diametrically opposed sides of the spacer,
wherein the first leg and the second leg each extend beyond the tangent point.

16. The riding lawn care vehicle of claim 12, wherein the splined retainer is configured to be held in place while the fastener is tightened simultaneously by a single tool that engages both the splined retainer and a head of the fastener.

17. The riding lawn care vehicle of claim 11, wherein the adjustment lever comprises a retention protrusion and a retention notch formed on a bent portion that is disposed at the second end of the adjustment lever,
wherein the first leg is configured to slide relative to the adjustment lever along a sliding surface, the sliding surface extending from the retention protrusion to the intersection of the second end with the first end, responsive to motion of the adjustment lever away from the neutral position in a first direction while maintaining contact between the adjustment lever and the first leg, and wherein the retention notch fixes the second leg in place relative to the adjustment lever responsive to motion of the adjustment lever in a second direction.

18. The riding lawn care vehicle of claim 17, wherein a distance measured from the transmission shaft to the bent portion is less than a distance measured from the transmission shaft to an attachment aperture at the first end of the adjustment lever where the steering assembly operably couples to the adjustment lever.

19. The riding lawn care vehicle of claim 11, wherein a longitudinal axis of the mounting bracket is parallel to a longitudinal axis of the adjustment lever when the adjustment lever is in the neutral position.

20. The riding lawn care vehicle of claim 11, wherein the torsion spring is operably coupled to the transmission shaft on an opposite side of the adjustment lever from the transmission.

* * * * *